United States Patent Office 3,383,959
Patented May 21, 1968

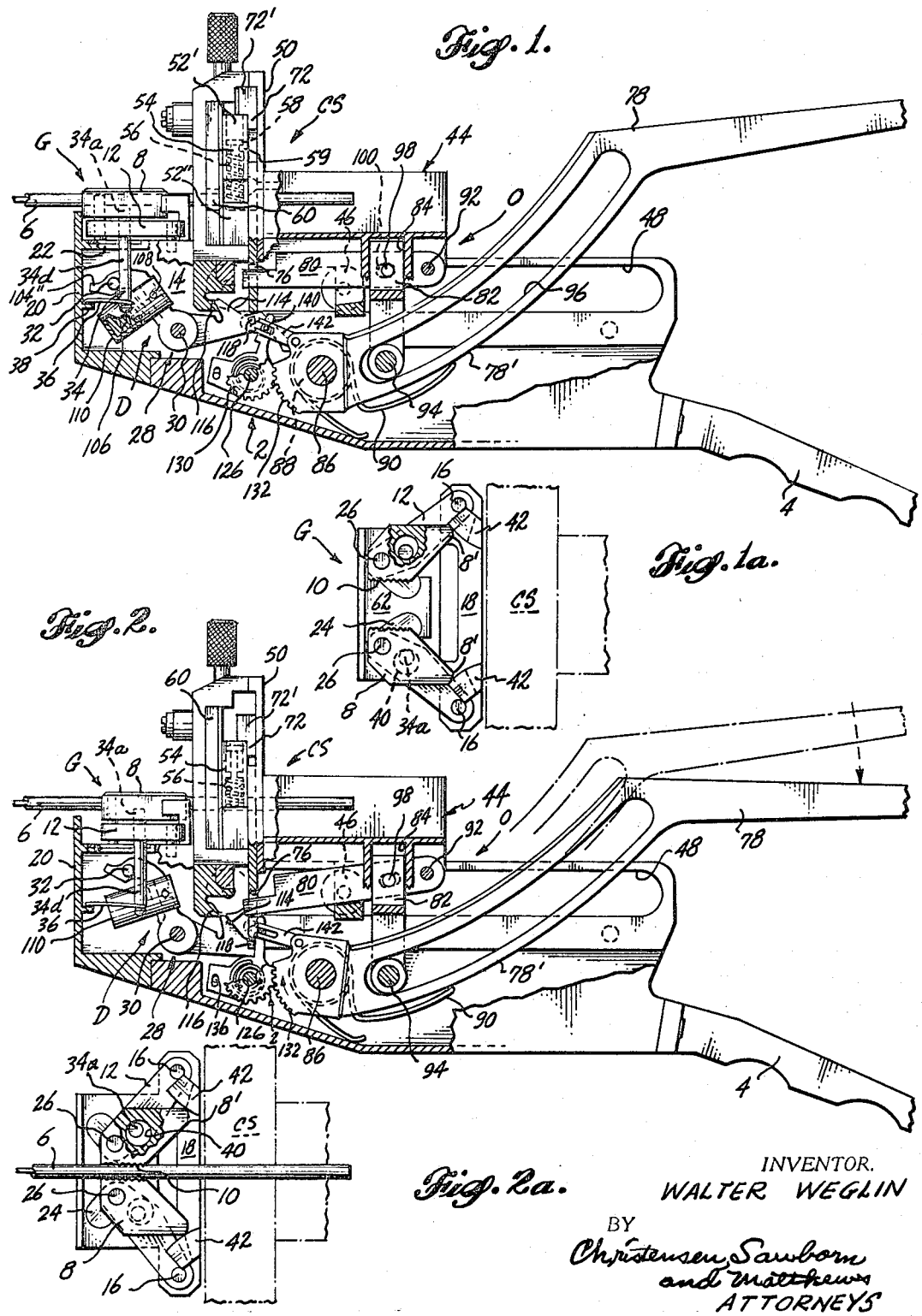

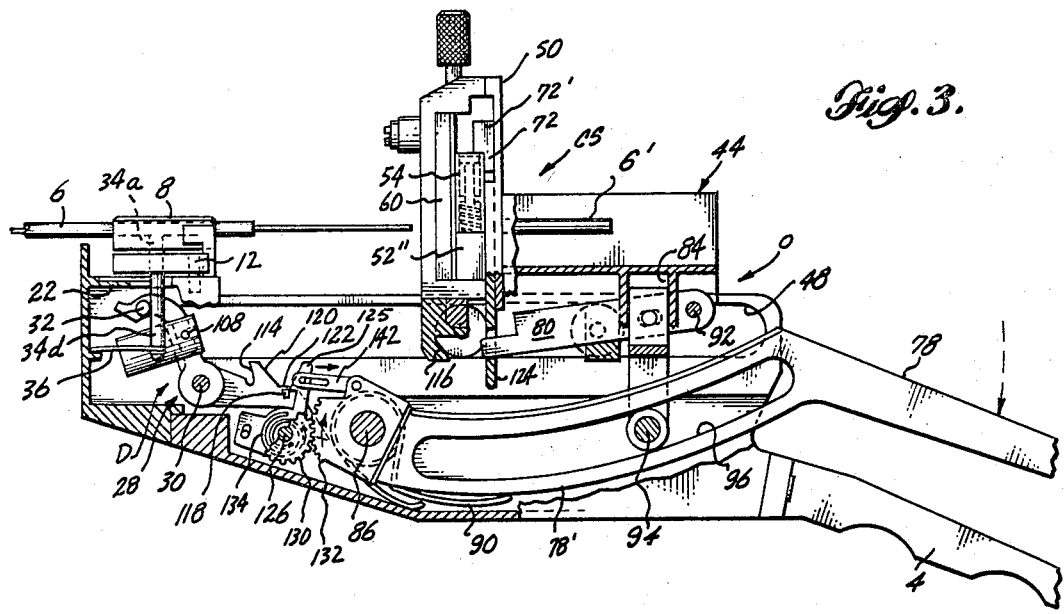

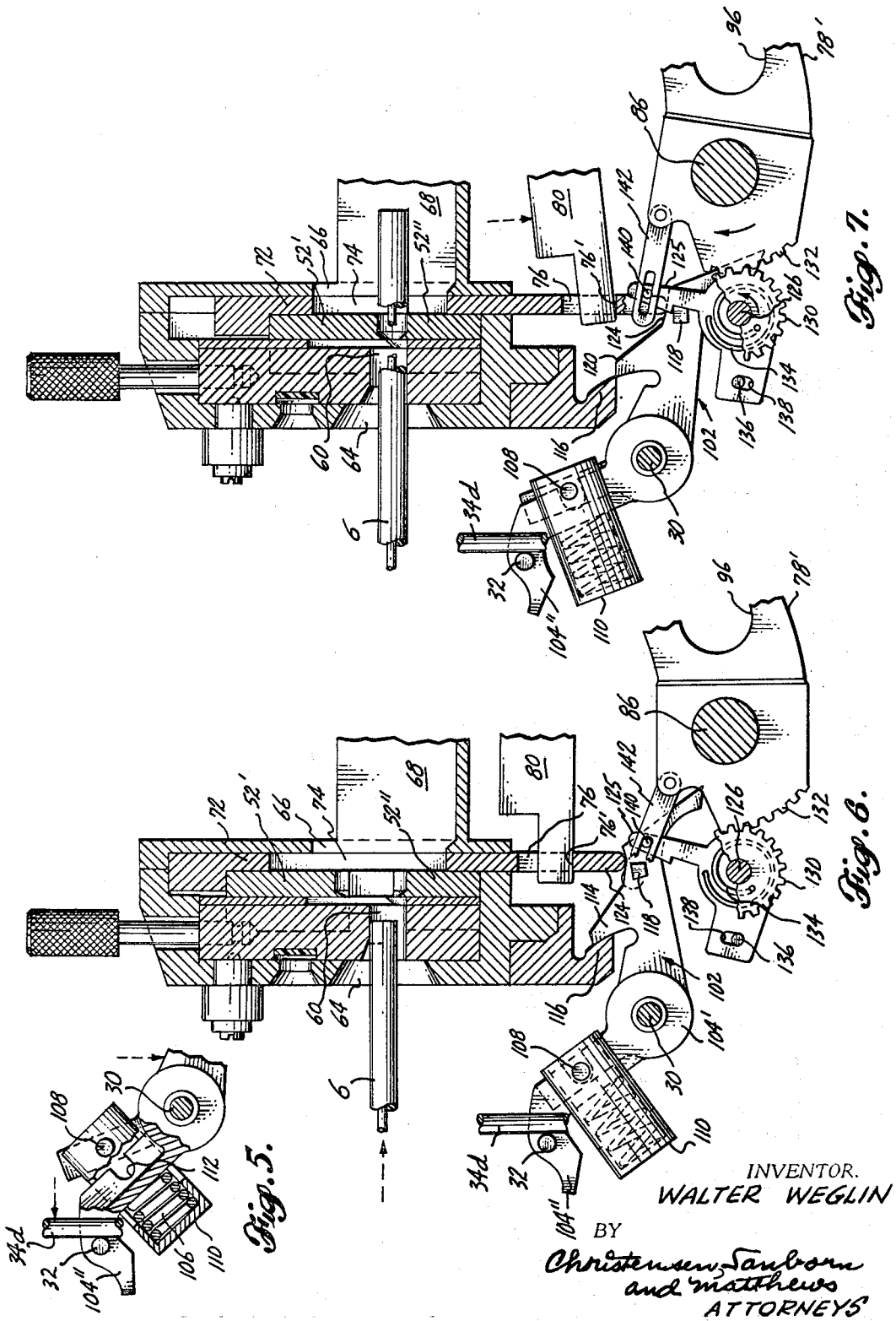

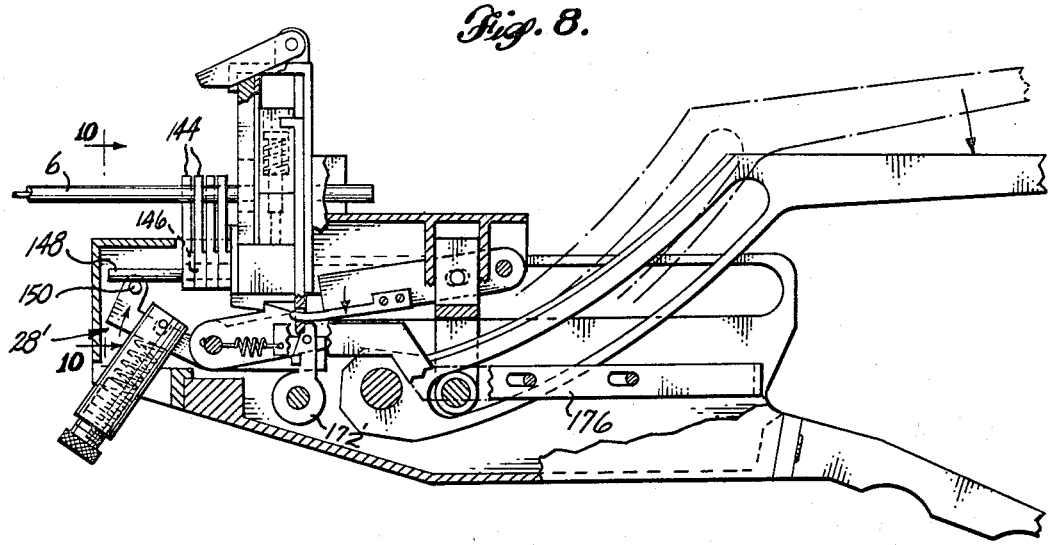
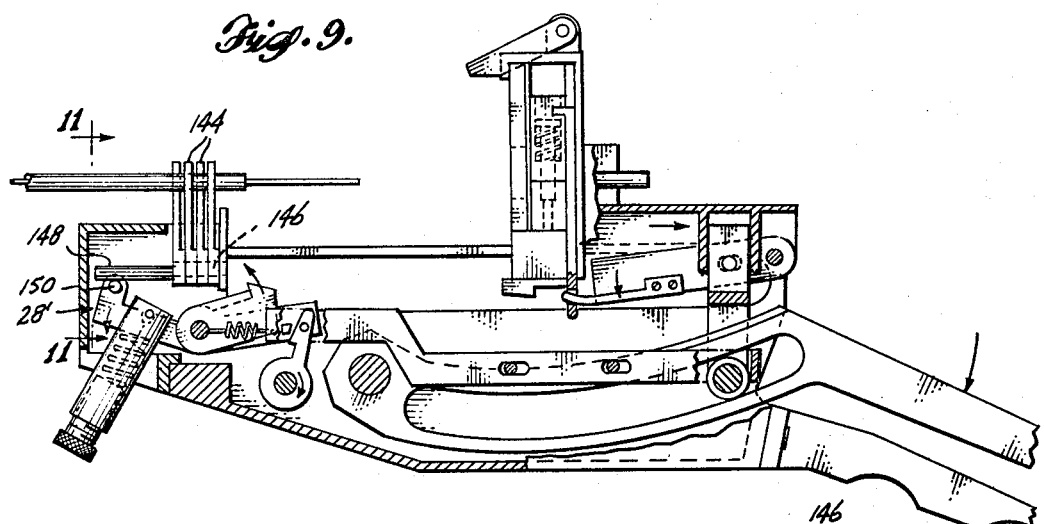
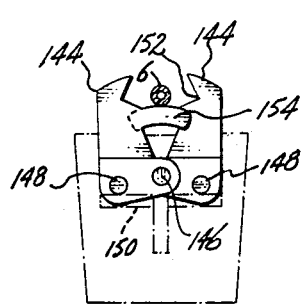
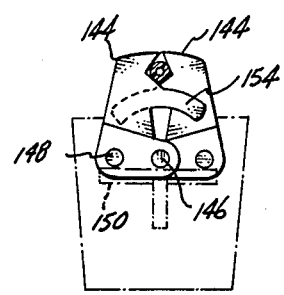
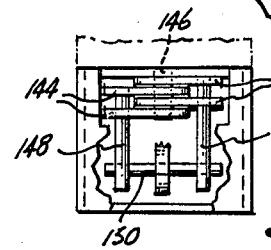

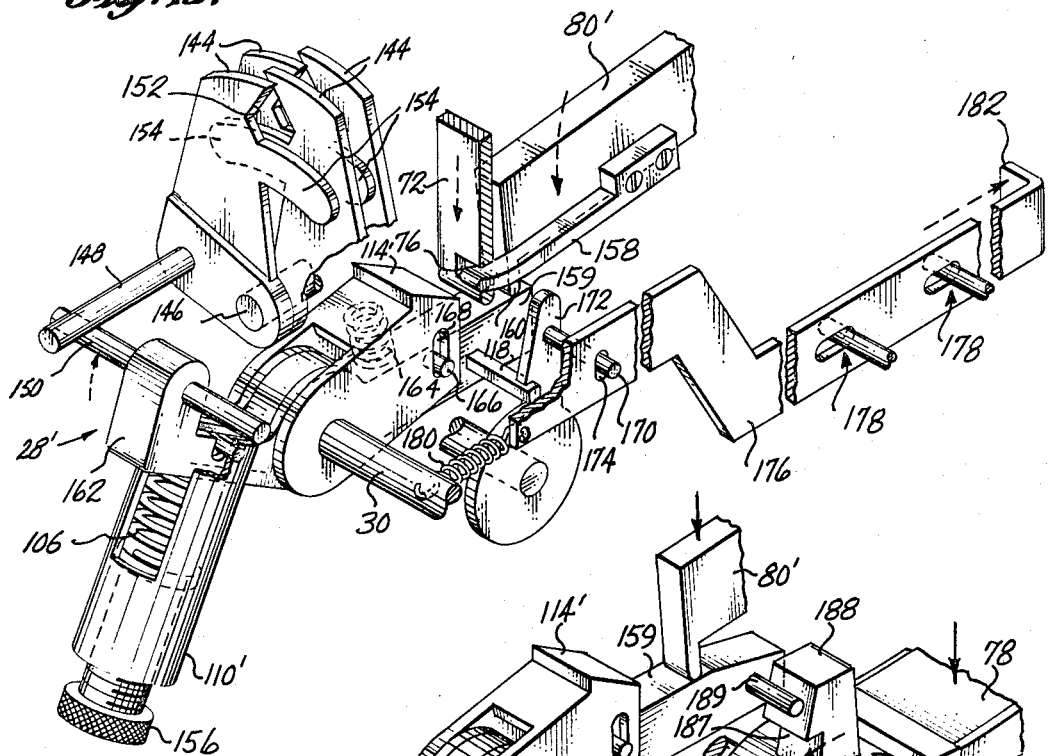
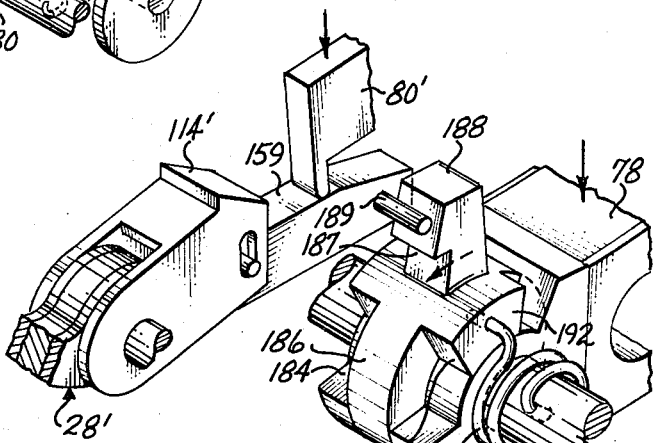
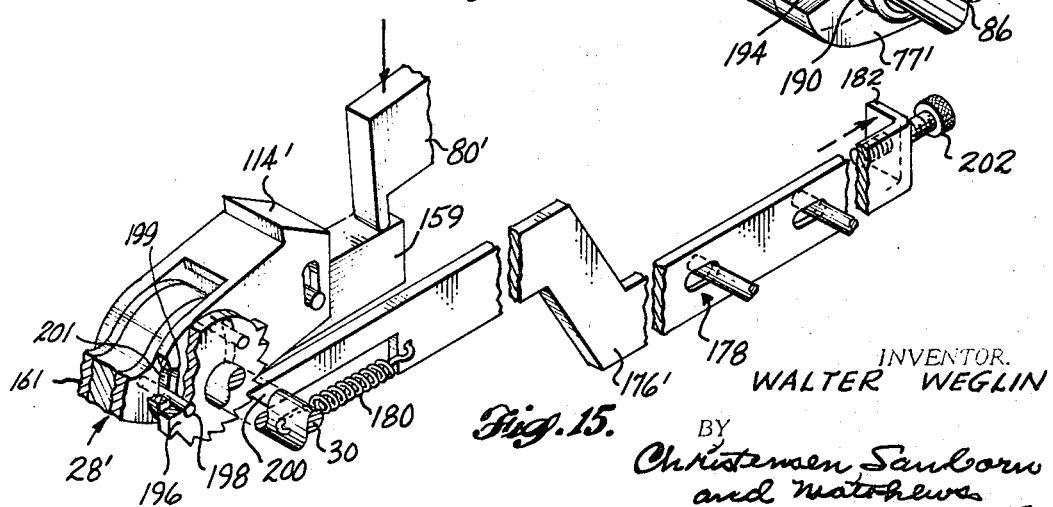

3,383,959
WIRE STRIPPING DEVICE
Walter Weglin, Seattle, Wash., assignor to The Boeing Company, Seattle, Wash., a corporation of Delaware
Filed Aug. 10, 1967, Ser. No. 659,807
24 Claims. (Cl. 81—9.5)

ABSTRACT OF THE DISCLOSURE

A wire stripping device is disclosed which cuts the insulation, grips the wire, strips away the insulative slug, and releases the stripped wire, all in response to a single motion on the part of the operator with respect to a simple operating member. The device strips off the insulative slug in a straight line and stages the cutting and stripping operations so that the cutting operation is completed before the stripping operation is begun. It also varies the power ratio of the two operations so that there is a high power ratio, such as four to one, for the cutting operation, and a progressively lower ratio (down to one to one), for the stripping operation. The device has a long stripping capability, such as 2½ inches, and automatically centers the wire before the stripping operation is begun. It also automatically controls the force used in gripping the wire, and increases the holding force in proportion to the diameter of the wire. At the end of the stripping operation, it automatically frees the stripped wire, and when the aforementioned operating member is released, the device recycles itself without striking or otherwise damaging the stripped wire. It is also adapted so that the cutting blades can be readily removed and replaced by the operator on the job.

---

*Field of the invention.*—This invention relates to wire stripping devices, and in particular to wire stripping devices of the type which are mechanically driven and either power-operated or hand-operated with, for example, a pliers-type crank operating member.

One object of the invention is to develop a wire stripping device of this type which cuts the insulation, grips the wire, strips away the insulative slug, and releases the stripped wire, all in response to a single action or motion on the part of the operator with respect to a single operating member.

Another object of the invention is to develop a device of this nature which strips away the insulative slug in a straight line, and stages the cutting and stripping operations so that the cutting operation is completed before the stripping operation is begun.

A still further object is to develop a wire stripping device of this nature in which the operating mechanism has a variable power ratio with respect to the cutting and stripping operations, the power ratio in the cutting operation being of a high order of magnitude, and the power ratio in the stripping operation becoming progressively lower as the insulative slug is removed from the wire.

Other objects include the development of a mechanical wire stripping device which has a long stripping capability, such as 2½ inches or more, yet can also strip far shorter lengths, if desired; and which carries out the stripping operation without stretching, tearing or otherwise damaging the insulation, and without nicking, scraping or otherwise damaging the metal conductor.

Still other objects include the development of a wire stripping device of this nature which automatically centers the wire before the stripping operation is begun, and which controls the force by which the wire is gripped during the stripping operation, so that the insulation is not pinched, squashed, or otherwise damaged as a result of the grip on it. They also include the development of such a device which increases the holding force on the wire, in proportion to the diameter of the wire; and which is automatically opened at the end of the stripping operation, so as to free the wire for prompt and safe removal from the device. Similarly, they include the development of a mechanical wire stripping device which has a readily removable and replaceable blade assembly, and which automatically recycles itself without striking or otherwise damaging the stripped wire; as for example, in constrast to those prior art devices which may strike the end of the exposed conductor as they recycle to the static condition.

Still further objects will become apparent from the description of the invention which follows.

*Summary of the invention.*—These objects and advantages are realized by a wire stripping device of my invention which comprises a pair of relatively reciprocable supports having working mechanisms thereon which are equipped with jaw and blade assemblies that open and close about a line extending parallel to the path of reciprocation. The supports are controlled by reciprocable operating means which are operative to reciprocate the supports in relation to one another after a period of lost motion with respect to the supports; but which are also operable during such period to close the jaw and blade assemblies about the foregoing line. In addition, there are latch means which are operative to maintain the supports in a relatively static condition during the period of lost motion on the part of the operating means; and to maintain the jaw and blade assemblies in a closed condition during the period of relative reciprocation on the part of the supports. Latch release means are operative to free the supports for relative reciprocation after the assemblies have closed; and to free one of the assemblies for opening after the supports have traveled over a predetermined distance in relation to one another.

The working mechanisms may include a pair of actuating members which are reciprocably mounted on the respective supports to close the assemblies; and the operating means may have a cam connection with the actuating members whereby it causes the members to reciprocate in response to an applied force, and then detaches from the actuating member on one of the supports while causing the supports to reciprocate in relation to one another as the force is continued. The two actuating members may be arranged in series so that when one member reciprocates, it in turn causes the other member to reciprocate, the one member being disposed on the other of the supports and cam connected with the aforesaid other member so as to detach therefrom when the supports reciprocate in relation to one another. Also, either actuating member may have a flexible connection with its associated assembly whereby it resiliently yields to the applied force, after its respective assembly has closed, to allow the other assembly to completely close before the supports are reciprocated in relation to one another. Preferably, both actuating members have such a connection with their respective assemblies.

In preferred hand-driven embodiments of the invention, the operating means include a hand-operated crank member which is pivotally mounted on the aforesaid one support, and interconnected with the aforesaid one actuating member on the other support by a coupler member which is slidably guided on the other support and cam connected with each of the crank member and the aforesaid one actuating member on the other support. Preferably, the actuating members are also pivotally mounted on their respective supports, and cam connected with their respective assemblies, so that the applied force is transmitted by cam connections throughout the mechanisms.

The latch means may include a pair of reciprocably mounted latch members on the supports, for maintaining the closed condition of the assemblies; and the operating means may be operative to cause relative reciprocation between the actuating members and the latch members, whereby the latch members interlock with the actuating members in the closed condition of the assemblies, while the supports reciprocate in relation to one another. The latch member for the aforesaid one actuating member may be constituted by the coupler member, the cam connection between the coupler member and the latter actuating member being such as to interlock the latter members when the assembly on the aforesaid other support is in the closed condition. The latch member for the other actuating member may be constituted by some form of detent which is biased into engagement with the aforesaid other actuating member, when the assembly on the one support is in the closed condition.

The latch means may also include a pair of relatively reciprocably mounted catch members on the supports which are biased to interengage with one another when the supports are in the relatively static condition. The aforesaid other actuating member on the one support may be spring biased to constitute one catch member, and may also have a flexible catch thereon which resiliently yields to the other support, when the supports are on the return stroke, to allow the other support to return to the static condition without opening the assembly on the one support.

The latch release means may include a pair of reciprocably mounted latch release members on the supports, for freeing the supports and the assembly on the one support at the appropriate times. The operating means may be operative to cause one latch release member to disengage the catch members when the assemblies are closed; and than at a later time, to cause the other latch release member to disengage the detent from the aforesaid other actuating member on the one support, when the supports have traveled the necessary distance in relation to another. The one latch release member may be constituted by the aforesaid one actuating member on the other support, where the actuating member on the one support constitutes a catch member. The other latch release member may be constituted by the aforesaid other support, by the operating crank, or by some other member which is conjointly reciprocable therewith.

If desired, the distance which the supports travel in relation to one another, before the detent is disengaged, can be varied to satisfy changing operating requirements.

Of course, as soon as the force is discontinued, i.e. the operating means are released, then the assembly on the other support is also free to open, if the coupler member also acts as a latch member.

The assemblies may both open and close in planes transverse to the path of reciprocation of the supports; or one assembly, such as the jaw assembly, may open and close in the plane of reciprocation while the blade assembly opens and closes in, say, a plane perpendicular to it. All of my presently preferred embodiments employ a rectilinear path of relative reciprocation for the supports.

Brief description of the drawings.—These and other features of the invention will be better understood by reference to the accompanying drawings wherein I have illustrated certain of my preferred embodiments.

FIGURE 1 is a part longitudinal cross-sectional view of one embodiment, when the device is in the static condition;

FIGURE 1A is a part plan view of the jaw mechanism in this embodiment, when the jaws are open in the static condition of the device;

FIGURE 2 is another part longitudinal cross-sectional view of the device, when the cutting operation is completed, but the insulative slug has not as yet been stripped from the wire;

FIGURE 2A is another part plan view of the jaw mechanism, when the jaws are closed after the cutting operation has been completed;

FIGURE 3 is a third part longitudinal cross-sectional view of the device, when the stripped operation is completed, but the device has not been recycled;

FIGURE 4 is a part perspective view of the jaw mechanism, and the means for latching the same, after the cutting operation of FIGURE 2;

FIGURE 5 is a part longitudinal cross-sectional view of a cam lever member in the jaw mechanism, when an oversized wire is engaged;

FIGURE 6 is a vertical cross-sectional view of the blade mechanism, together with the latch means for the jaw mechanism, when the device is in the static condition;

FIGURE 7 is another vertical cross-sectional view of the blade mechanism, and the latch means for the jaw mechanism, when the device has completed the cutting operation, but has not as yet started the stripping operation;

FIGURE 8 is a part longitudinal cross-sectional view of another embodiment, after the cutting operation is completed, but stripping has not begun;

FIGURE 9 is a part longitudinal cross-sectional view of this second embodiment, after the stripping operation is completed, but the device has not been recycled;

FIGURE 10 is a part elevational view of portions of the jaw mechanism in the embodiment of FIGURES 8 and 9, when the jaws are open;

FIGURE 11 is a part elevational view of the jaw mechanism, when the jaws are closed;

FIGURE 12 is a part plan view of the jaw mechanism, when the jaws are closed;

FIGURE 13 is a part perspective view of the jaw mechanism in FIGURES 8 and 9, and the means for latching the same, after the cutting operation of FIGURE 8;

FIGURE 14 is a part perspective view of a different form of latch means for the jaw mechanism; and FIGURE 15 is a part perspective view of yet another form of latch means.

Description of the preferred embodiments.—Referring to FIGURES 1–4, it will be seen that the device comprises a jaw mechanism G, a combined cutting and stripping mechanism CS, and a crank-driven operating mechanism O for initiating and coordinating the action of the two working mechanisms. All three mechanisms are mounted on an open-bed, cradle-like toolholder 2 having a downwardly inclined finger grip handle 4 rigidly affixed to the right-hand or rear end thereof. The toolholder acts as a relatively stationary support for the jaw mechanism, and also as a shears for the cutting and stripping mechanism which is movably guided in the toolholder to reciprocate in relation to the jaw mechanism. In use, a wire such as that seen at 6 is gripped by the jaw mechanism, and an insulative slug 6′ is cut and stripped therefrom by the combined action of the two working mechanisms. Therefore, each of these will be described in detail before the operating mechanism is described in relation to them.

The jaw mechanism G comprises a pair of oppositely disposed jaw members 8 which have a flat, irregularly trapezoidal configuration in plan view and mutually opposing, spaced parallel jaw faces 10 which are serrated, knurled or otherwise roughened to engage and grip the wire 6. The jaw members 8 are carried on a pair of hinged elbow arms 12 which swivel in a horizontal plane over the bed 14 of the holder, from hinged elbow connections 16 at the outlying ends of a crosshead 18. The crosshead is rigidly affixed across the top of the holder, near the front end or nose 20 of the same. Projecting inwardly from the nose is a horizontal flange 22 which is equipped with a pair of Teflon bearing plates 24. The plates serve as low-friction tracks or slides for a pair of wrist pins 26 which are secured in upright position on the free ends of the arms 12, and projected both above and below the arms, to serve as hinges for the jaws, and sliding supports for the arms.

The arms 12 are driven by the operating mechanism O through the medium of a cam drive mechanism D in the bed of the holder. The drive mechanism D includes a longitudinally disposed cam lever 28 which is pivotally mounted on a fixed transverse shaft 30 near the front end of the holder. The cam lever 28 has a pair of laterally extending lug pins 32 which are affixed near the front end of the lever and engageable with a pair of upright cam pins 34 on the arms. The cam pins 34 are located intermediate the hinged connections 16 and 26 on the arms, and have portions both above and below the arms. The depending portions 34d are interconnected by a bent wire spring 36 which rests on an inwardly extending ledge 38 at the nose 20 of the holder, and tends to bias the arms 12 in the laterally outward directions. Accordingly, the jaws are normally open in the disposition of FIGURE 1A, the outward movement of the arms being limited by the flange 22, however, which halts the pins 34 after a small degree of travel. The upstanding portions 34a of the pins 34 are loosely received in cam holes 40 formed in the undersides of the jaws 8. The arrangement is such that the pins 34 bear against the sides of the holes 40 as the arms are swung, and cause the somewhat-pointed rear ends 8' of the jaws to bear against the curved surfaces of L-shaped cam posts 42 erected on the crosshead 18. The cam posts 42 tend to maintain the parallel condition of the jaw faces 10 as the jaws are closed in operation.

The cam lever 28 is constructed from two lever members 102 and 104 which are assembled and mounted on the shaft 30 to pivot in unison under the bias of a caged spring 106. See FIGS. 4 and 5, in particular. One lever member 102 is in the form of a rocker which has forwardly and rearwardly extending crank portions 102' and 102", respectively; and the other member 104 is in the form of a crank which has a transversely slotted head 104' to straddle the rocker, and a longitudinally slotted arm 104" to accommodate the forwardly extending portion 102' of the rocker. This latter portion carries a cross pin 108 to which the cage 110 of the cage spring 106 is attached. The spring 106 is interposed between the closed end of the cage and the back of the crank arm 104", to cause the latter to abut against the rocker 102, there being a pair of notches 112 in the crank arm to accommodate the cross pin. See FIGURE 5.

Turning now to the cutting and stripping mechanism CS, it will be seen that this mechanism comprises a reciprocable carriage 44 which is installed within the bed 14 of the holder and equipped at its sides with wheels or rollers 46 that engage in straight parallel tracks 48 recessed lengthwise into the walls of the holder. Supported in a crosswise position on the carriage is a tubular cartridge 50 which has a pair of blade members 52 enclosed therein. See FIGS. 6 and 7. The blade members are cut and assembled in accord with the invention described in my copending application Ser. No. 659,808 filed Aug. 10, 1967, and entitled, Blade Assembly and/or Stripping Frame for Wirestripping Devices. However, for the purposes of the present invention, I need only mention that one 52' of the members 52 is superposed over the other 52", in guillotine fashion; and slidably engaged on guide posts 54 which are erected upright on the lower member 52" and equipped with coil springs 56 that bias the upper member 52' in the upward direction against flange caps 58 formed on the posts 54. The caps 58 cooperate with a flange 59 in the upper member to limit the separation of the members to the static condition of FIGURE 1, wherein the throat 60 of the assembly is open and aligned with the nip 62 between the jaws of the jaw assembly, for insertion of a straight length of the wire through the cartridge. To accommodate the wire, the cartridge has front and back apertures 64 and 66, respectively, which pass the wire into a troughed receiver 68 at the back of the carriage, where there is a scale which enables the operator to position the wire in terms of the length of insulation to be removed.

The blade assembly is closed by an upright T-shaped blade depress bar 72 which is also enclosed in the cartridge 50. The depress bar is slidably engaged between the lower blade member 52" and the rear wall of the cartridge, and has a flanged lip 72' which overlies the upper blade member 52', so that the upper member is depressed by the act of depressing the bar itself. A slot 74 in the upper portion of the bar passes the wire to the receiver 68, whereas a second slot 76 at a lower position in the bar provides a cam surface 76' with which the operating mechanism closes the blade assembly, as shall be explained. See FIGURE 6.

The bar 72 is driven by the operating mechanism through the medium of a cam drive crank 80 which is pivotally mounted on a fixed transverse shaft 92 at the rear of the carriage. The crank is inserted through the slot 76 in the lower portion of the bar, to rest on the surface 76' in the static condition of FIGURE 1. A short slot 100 is formed in or removed from the right-hand end portion of the crank.

Having described the working mechanisms, it is now in order to refer to the operating mechanism and the manner in which it initiates and coordinates the action of the working mechanisms. Referring again to FIGURES 1–4, it will be seen that the operating mechanism O comprises a crank 78 which has a slotted fore portion 78' and is pivotally mounted on a shaft 86 fixed across the bottom of the holder, between a pair of bosses 88 on the walls of the holder. The crank 78, which shall be referred to as the "tool crank" to distinguish it from the crank 80 on the carriage (the "carriage crank"), is positioned so as to extend in a rearwardly directed attitude over the fixed handle 4, for use by the operator as a driver in actuating the device. The attitude of the same is maintained by a torsion spring 90 which is wrapped about the bosses, braced against the floor of the holder, and then passed under the slotted fore portion 78' of the crank, to bias it in the counter-clockwise direction against a shoulder (not shown) in the bottom of the holder. A lug (not shown) on the crank engages the shoulder, to limit the extent of its rotation.

The tool crank 78 and the carriage crank 80 are interconnected by a coupler yoke 82 which is slidably guided in a vertical slot 84 on the frame of the carriage. The legs of the yoke carry a rotatable cam roller 94 which is slidably engaged in the slot 96 of the tool crank; while the head of the yoke has a laterally projecting lug pin 98 which is slidably engaged in the slot 100 of the carriage crank. In the static condition of the device, the roller 94 occupies a position closely adjacent to, but nevertheless slightly spaced from the left-hand end of the slot 96; whereas the lug pin 98 abuts the right end of the slot 100.

The tool crank 78 and the cam lever 28 are interconnected by the depress bar 72, acting in response to and in series with the carriage crank 80. The upper surface 120 of the rearwardly extending portion 102" of rocker 102 is sloped, but has a step 122 on which the heel 124 of the depress bar 72 rests when the device is in the static condition of FIGURE 1.

As shall be explained, the operating mechanism operates not only to close the jaw ad blade assemblies, and to drive the carriage through the stripping operation, but also to maintain the blade assembly in closed condition while the stripping operation is being effected. Additional means are used, however, for maintaining the static condition of the carriage during the cutting operation, and for maintaining the closed condition of the jaw assembly during the stripping operation. Firstly, the rearwardly extending portion 102" of rocker 102 carries an upright pawl 114 which is engageable with a catch 116 depending from the bottom of the carriage. The rearwardly extending portion of the rocker also has a laterally extending lug pin 118 which is square shaped in cross section and disposed below the step 122.

On the other hand, referring in particular to FIGURE 4, it will be seen that the holder 2 contains a third fixed transverse shaft 126, at a point between the crank shaft 86 and the lever shaft 30 near the bottom of the holder; and both an upright dog 125 and a toothed spur gear 130 are pivotally mounted on this third shaft 126. The spur gear 130 is mated with another spur gear 132 on the head 77 of the tool crank 78, and the dog is interconnected with the gears, in turn, by a torsion spring 134 which is wrapped around the shaft 126 and fixed to each of the dog and the coaxial gear 130. In the static condition of FIGURE 1, the dog has a slight clockwise bias; whereas the gears 130, 132 tend to rotate the dog 125 in the counterclockwise direction, when the tool crank 78 is depressed in the operation of the device. A lug pin 136 fixed on the holder interengages with a slot 138 on the dog to limit the rotational movement of the dog in each case. Also another lug pin 140 fixed on the dog is engaged by a slotted link 142 which is pivotally connected to the head of the crank. During the operation of the device, the dog 125 cooperates with the square pin 118 on the cam lever to maintain the jaw assembly in closed condition until the slotted link 142 snatches the dog away from the action of the spur gears, as shall be explained.

In the static condition of the device, the tool crank 78 is at rest in the attitude of FIGURE 1, both of the assemblies 8 and 52 are open under the bias of the springs 36 and 56, respectively, and the carriage 44 is drawn up immediately behind the jaw mechanism G, and latched against reciprocation by the interengagement of the pawl 114 with the catch 116. Also, the step 122 of the cam lever 28 is in abutment with the heel 124 of the depress bar 72, the cam roller 94 on the coupler yoke 82 is disposed in a position relatively adjacent to the crankshaft 86 of the tool crank 78, and the dog 125 is rearwardly offset from and below the square pin 118 on the cam lever. Before he initiates the cutting and stripping operation, the operator inserts the wire 6 through the throat 60 of the blade assembly, and then extends it along the receiver 68 to the desired length for the stripping operation. Then, while holding the wire in the nip 62 between the gripper jaws 8, he sets the operation in motion by squeezing the tool crank 78 toward the handle 4. Initially, the force of the crank drives the yoke 82 downwardly, and causes the carriage crank 80 to pivot in the same direction. The motion of the latter operates in turn to depress the bar 72 in the blade mechanism, thus closing the blade assembly and severing the insulative jacket of the wire.

Simultaneously, the bar 72 depresses the rearwardly extending crank portion 102″ of the cam rocker and causes the rocker to pivot about its shaft 30 in the clockwise direction. Due to the considerable bias of the caged spring 106, the cam crank 104 operates in unison with the rocker to apply the lug pins 32 against the cam pins 34d on the arms 12 of the jaw mechanism. The resulting pivotal motion on the part of the arms swivels the jaws 8 inwardly toward the wire, while the upstanding portions 34a of the pins 34 maintain the parallel relationship of the jaws, by retaining them against the surfaces of the cam posts 42. Thus, as the jaws close, the force of the tool crank is distributed over the entire area of the jaw faces 10 so as to not pinch the insulation.

Moreover, the two-part construction of the cam lever 28 assures that the jaw mechanism adjusts to all jacket diameters without squashing the wire. In the case of a small diameter wire, the cam rocker 102 and cam crank 104 of the cam lever remain together while the jaws seize the wire. This is to say, the compression spring 106 remains extended in its initial condition. However, when a larger diameter wire is inserted, the jaws cease to close about the wire as soon as the tension in the spring 106 is overcome, and the spring thereafter takes up the additional force of the tool crank while maintaining the grip of the jaws on the wire. See FIGURE 5.

As soon as the upper blade member 52′ abuts the lower member 52″, the bar 72 resists any further attempt to depress it. However, at this point the pivotal motion of the cam lever 28 has lowered the pawl 114 to a position below the catch 116, and the spur gears 130, 132 have effectively pivoted the dog 125 into an overlying position with respect to the square pin 118 on the cam lever, and latched the lever against counterrotation. The bar 72 is thus relieved of the function of depressing the lever, and since the step 122 is substantially parallel to the track 48, all parts of the carriage 41 are free to reciprocate.

The resulting condition of the device can be seen in FIGURE 2. In addition to the foregoing, it will also be noted that the carriage has not changed its position with respect to the holder. Throughout the initial movement of the tool crank, the operation was entirely one of cutting the insulation and gripping the wire, and the motion of the crank was entirely lost with respect to the operation of stripping the insulative slug from the wire. Also, during the time when the operator's open-handed grip was least capable of generating a high force level, the device was operating at its highest power ratio, due to the proximity of the cam roller 94 to the crankshaft 86. Therefore, a clean, sharp cut was made in the insulation, before there was any motion on the part of the cutting and stripping mechanism, lengthwise of the wire.

However, once the cut is complete, the yoke 82 and the carriage are subject to the horizontal component of force on the part of the tool crank. While the yoke and carriage crank are held in position, the component is applied to the carriage, and the carriage is caused to travel in the right-hand direction of the figure. Meanwhile, the bar 72 is also held tightly in the position of FIGURE 2, due to the continued application of the vertical component to the yoke, so that the closed condition of the blade assembly is maintained and the insulative slug 6′ is forcibly removed from the wire. Of course, as the tool crank approaches the handle, and the cam roller moves away from the crankshaft, the force of the tool on the carriage is progressively lessened. This fact enables the stripping operation to be drawn out over a lengthy course and provides the device with a relatively long strip length capability. However, the decrease in force does not limit the effective power of the device, since the drag of the slug on the conductor also decreases as more and more of the slug is removed.

Finally, following a predetermined distance of travel, the tool crank reaches a point (FIG. 3) wherein the slotted link 142 engages the lug pin 140 on the dog, and the dog is rotated slightly in the clockwise direction to disengage it from the square pin 118 on the cam lever. The wire spring 36 between the cam pins 34d thereupon flings open the jaws and rocks the lever 28 counterclockwise into abutment with the ledge 38. Also, as the operator releases his grip on the tool crank, the torsion spring 90 in the bottom of the holder reverses the motion of the crank and drives the carriage forward toward the static position of FIGURE 1; the catch 116 meanwhile riding up the slope 120 of the cam lever, and momentarily depressing the lever until the carriage seats in front of the pawl.

Due to this latter feature, the wire is preferably removed from the nip 62 of the jaw assembly before the device is recycled.

Of course, as the carriage returns to its static position, the springs 56 open the blade assembly, and each of the other elements, including the latch mechanism 125, 130, 134, returns to its initial position.

In the embodiment of FIGURES 8–13, several variations are incorporated to facilitate and improve upon the operation of the device in FIGURES 1–4. One of these variations concerns the jaw mechanism. In the embodiment of FIGURES 1–4, the horizontal swing of the gripper jaws 8 necessitates the insertion of an inch or more of wire, simply to span the gap between the nip 62 of the jaw mechanism and the throat 60 of the blade assembly. Yet, in the case of many wire installations, such as shielded wire installations, there is often less than this length of wire available for the stripping operation as, for example, where a grounding jumper is located near the end of the wire prior to the final termination of the same. Therefore, in the modified version of FIGURES 8–13, a different jaw mechanism is employed to shorten the wire length requirements of the device.

The jaw mechanism comprises four vertically oriented gripper jaws 144 which are pivotally mounted on a common shaft 146 fixed to extend lengthwise of the toolholder 2. The gripper jaws 144 are arranged in pairs on opposite sides of the shaft 146, and at alternate positions so as to interdigitate with one another. Horizontal cam pins 148 connected with each pair are engaged by laterally projecting lug pins 150 on a cam lever 28'. Thus, as in the case of the embodiment in FIGURES 1–4, a clockwise motion of the lever 28' causes the jaws 144 to close about the line of the wire 6. As they close, the wire is engaged in V-notches 152 formed on the leading edges of the jaws. In addition, tongues 154 projecting below the notches 152 in the plane of movement form a broad line of support for the wire so that the wire is seized in a four point grip which avoids any tendency to flatten the sides of the same. The modification is particularly adapted to stripping plastic and multilayer insulations that are difficult to hold without slippage and severe damage to the insulation. The extended line of four point contact also assists in centering the wire with respect to the throat of the blade assembly.

The overtravel feature in the cam lever 28' is also modified in that an adjustment screw 156 is threaded into the end of the spring cage 110' to provide for adjustment in the loading of the spring 106.

Another modification provides for overtravel on the part of the carriage crank to assure that the blade assembly is completely closed before the stripping operation is begun. In the modified form of FIGURES 8–13, the carriage crank 80' carries a flat spring 158 which engages in the slot 76 of the depress bar 72 to transfer the motion of the crank to the bar. In addition, the carriage crank also has a flanged tip 16 which extends below the spring. When the device is actuated, the spring operates to depress the bar to close the blade assembly. After it does so, the tip of the carriage crank continues downwardly to depress the cam lever 28' and release the pawl 114' from the catch on the carriage, while the spring 158 takes up the lost motion of the crank with respect to the bar.

A still further modification concerns the recycling of the device. In the embodiment of FIGURES 1–4, the carriage must depress the pawl on the cam lever in returning to the static condition of FIGURE 1. For this reason, the pawl has an inclined back 120 to allow the catch to ride over it on the return stroke. Of course, in doing so, the catch repeats the operation of the jaw mechanism. Therefore, to avoid this, the modification in FIGURES 8–13 employs a cam lever 28' having a separate pawl 114' member which, like the crank 162, is bifurcated to accommodate the rocker 159. In this case, however, the pawl member is straddled over the rearwardly extending portion of the rocker and a coil spring 164 is interposed between it and the rocker to bias the pawl member in the upward direction. A pair of lug pins 166 on the rocker engage in slots 168 in the pawl member to limit its upward movement. When the device recycles to the static condition, the catch on the carriage merely depresses the pawl member against the compression of the spring 164 before seating behind the member.

Other modifications concern the latch release mechanism for the jaw assembly. In the modified form of FIGURES 8–13, a laterally projecting lug pin 170 on the dog 172 is slidably engaged in an upright slot 174 in an elongated trip bar 176 which is slidably mounted in the bed of the toolholder by means of a pair of pin and slot connections 178. The forward end of the trip bar is connected to the shaft 30 of the cam lever 28' by means of a coil spring 180. As the carriage is driven to the rear, it reaches a point where it abuts an inwardly directed flange 182 on the bar so as to drive the bar to the rear and thus disengage the dog from the square pin 118 on the rocker 159.

In FIGURE 15, the trip bar 176' has a pointed detent 200 at its forward end which engages between the teeth of a ratchet 196 on the cam lever 28'. The ratchet is secured to the rocker 159 by means of dowel pins 198 which pass through arcuate slots 199 and 201 in the pawl and crank member 114' and 161, respectively. The ratchet turns with the rocker when the latter is depressed by the carriage crank 80'; and the detent 200 thereafter maintains the closed condition of the jaw assembly until the carriage abuts a screw 202 on the flange 182 of the bar, whereupon the bar is driven to the rear in the manner of FIGURE 13.

The screw 202 can be adjusted in position to alter the strip length capability of the device.

In FIGURE 14, greater than one quadrant of the head 77' of the crank 78 is removed or omitted, and the remainder is bifurcated to accommodate the torus 186 of a dog 188 which is rotatable on the shaft 86 with the crank. A torsion spring 190 on the shaft urges the dog into abutment with a round lug pin 189 on the rocker 159. When the cam lever 28' is depressed, the pin drops into engagement with a flanged lip 187 on the dog, and remains there to maintain the closed condition of the jaw assembly, until the snout 184 of the crank rotates into abutment with corresponding surfaces 194 on the wings 192 of the dog. At this point, the crank rotates the dog against the bias of the spring 190 and releases the cam lever from engagement with the lip 187.

Other modifications and additions will be apparent to those skilled in the art without departing from the scope and spirit of the claims following.

I claim as my invention:

1. A wire stripping device comprising a pair of relatively reciprocable supports having working mechanisms thereon which are equipped with jaw and blade assemblies that open and close about a line extending parallel to the path of reciprocation, reciprocable operating means which are operative to reciprocate the supports in relation to one another after a period of lost motion with respect to the supports, but which are also operable during such period to close the jaw and blade assemblies about the foregoing line, latch means which are operative to maintain the supports in a relatively static condition during the period of lost motion on the part of the operating means, and to maintain the jaw and blade assemblies in a closed condition during the period of relative reciprocation on the part of the supports, and latch release means which are operative to free the supports for relative reciprocation after the assemblies have closed, and to free one of the assemblies for opening after the supports have traveled over a predetermined distance in relation to one another.

2. A wire stripping device according to claim 1 wherein the working mechanisms include a pair of actuating members which are reciprocably mounted on the respective supports to close the assemblies, and the operating means has a cam connection with the actuating members whereby it causes the members to reciprocate in response to an applied force, and then detaches from the actuating member on one of the supports while causing the supports to reciprocate in relation to one another as the force is continued.

3. A wire stripping device according to claim 2 wherein the actuating members are arranged in series so that when one member reciprocates, it in turn causes the other member to reciprocate, the one member being disposed on the other of the supports and cam connected with the aforesaid other member so as to detach therefrom when the supports reciprocate in relation to one another.

4. A wire stripping device according to claim 3 wherein at least one of the actuating members has a flexible connection with its associated assembly whereby it resiliently yields to the applied force, after its respective assembly has closed, to allow the other assembly to completely close before the supports are reciprocated in relation to one another.

5. A wire stripping device according to claim 3 wherein the operating means include a hand-operated crank member which is pivotally mounted on the aforesaid one support, and interconnected with the aforesaid one actuating member on the other support by a coupler member which is slidably guided on the other support and cam connected with each of the crank member and the aforesaid one actuating member on the other support.

6. A wire stripping device according to claim 5 wherein the actuating members are also pivotally mounted on their respective supports, and cam connected with their respective assemblies.

7. A wire stripping device according to claim 5 wherein the latch means include a pair of reciprocably mounted latch members on the supports, for maintaining the closed condition of the assemblies, and the operating means are operative to cause relative reciprocation between the actuating members and the latch members, whereby the latch members interlock with the actuating members in the closed condition of the assemblies, while the supports reciprocate in relation to one another.

8. A wire stripping device according to claim 7 wherein the latch member for the aforesaid one actuating member is constituted by the coupler member, the cam connection between the coupler member and the latter actuating member being such as to interlock the latter members when the assembly on the aforesaid other support is in the closed condition.

9. A wire stripping device according to claim 8 wherein the latch member for the other actuating member is constituted by a detent which is biased into engagement with the aforesaid other actuating member, when the assembly on the one support is in the closed condition.

10. A wire stripping device according to claim 7 wherein the latch means also include a pair of relatively reciprocably mounted catch members on the supports which are biased to interengage with one another when the supports are in the relatively static condition.

11. A wire stripping device according to claim 10 wherein the aforesaid other actuating member on the one support is spring biased to constitute one catch member.

12. A wire stripping device according to claim 11 wherein the aforesaid other actuating member has a flexible catch thereon which resiliently yields to the other support when the supports are on the return stroke, to allow the other support to return to the static condition without opening the assembly on the one support.

13. A wire stripping device according to claim 9 wherein the latch release means include a pair of reciprocably mounted latch release members on the supports for freeing the supports and the assembly on the one support at the appropriate times.

14. A wire stripping device according to claim 13 wherein the operating means are operative to cause one latch release member to disengage the catch members when the assemblies are closed, and thereafter to cause the other latch release member to disengage the detent from the aforesaid other actuating member on the one support, when the supports have traveled the necessary distance in relation to one another.

15. A wire stripping device according to claim 14 wherein the one latch release member is constituted by the aforesaid one actuating member on the other support.

16. A wire stripping device according to claim 15 wherein the other latch release member is constituted by the aforesaid other support.

17. A wire stripping device according to claim 15 wherein the other latch release member is constituted by the crank member.

18. A wire stripping device according to claim 14 further comprising means for adjusting the distance which the supports travel in relation to one another before the detent is disengaged.

19. A wire stripping device according to claim 1 wherein the assemblies open and close in planes transverse to the path of reciprocation of the supports.

20. A wire stripping device according to claim 1 wherein one assembly opens and closes in the plane of reciprocation while the other assembly opens and closes in a plane perpendicular to it.

21. A wire stripping device according to claim 1 wherein the supports reciprocate over a rectilinear path in relation to one another.

22. A wire stripping device having relatively reciprocable working mechanisms thereon equipped with jaw and blade assemblies that open and close about a line extending parallel to the path of reciprocation, and means for operating the mechanisms and the assemblies thereon, said jaw assembly including a pair of arms which are hinged to swivel in a common plane and equipped with jaws that are pivotally connected to the arms to swivel in conjunction therewith while also pivoting in relation thereto, said jaws having parallel, oppositely disposed jaw faces, and there being cam means operatively interconnecting the jaws and the arms whereby the faces of the jaws maintain a parallel relationship while the arms are swiveling in relation to one another.

23. A wire stripping device according to claim 22 wherein the cam means include a pair of fixed cam surfaces, and a cam connection between each arm and its associated jaw whereby the jaws are caused to bear against the cam surfaces while the arms swivel in relation thereto.

24. A wire stripping device having relatively reciprocable working mechanisms thereon equipped with jaw and blade assemblies that open and close about a line extending parallel to the path of reciprocation, and means for operating the mechanisms and the assemblies thereon, said jaw assembly including a pair of jaws pivotally mounted on a common shaft to swivel in parallel planes to one another, said jaws having V-shaped notches therein which are oppositely disposed in relation to one another, and underscored by tongues that project forwardly in the planes of movement, below the notches, to support the wire as the notches close about the foregoing line.

References Cited
UNITED STATES PATENTS

| | | | |
|---|---|---|---|
| 2,871,740 | 2/1959 | Andren | 81—9.51 |
| 3,125,908 | 3/1964 | Rozmus | 81—9.5 |
| 3,222,957 | 12/1965 | Kramer | 81—9.51 |
| 3,311,001 | 3/1967 | Gallgher et al. | 81—9.5 |

MILTON S. MEHR, *Primary Examiner.*